June 12, 1962 D. BEGGS ET AL 3,038,790
CONTACTING OF AGGREGATE MATERIALS WITH FLUIDS
Filed June 9, 1958
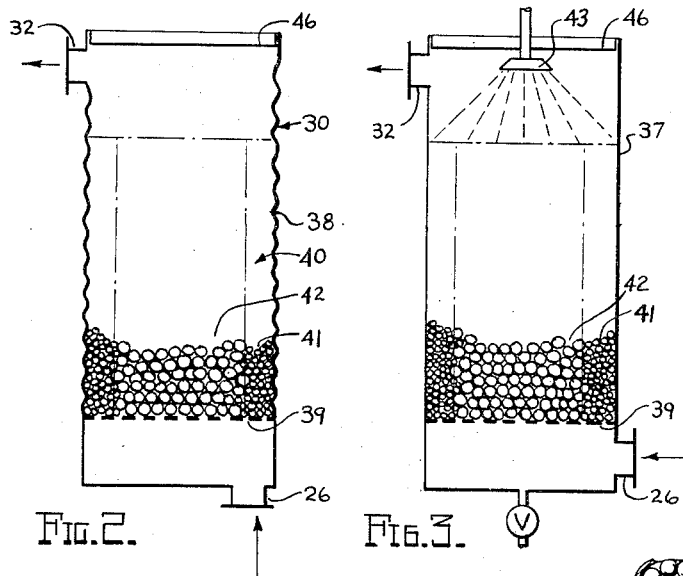
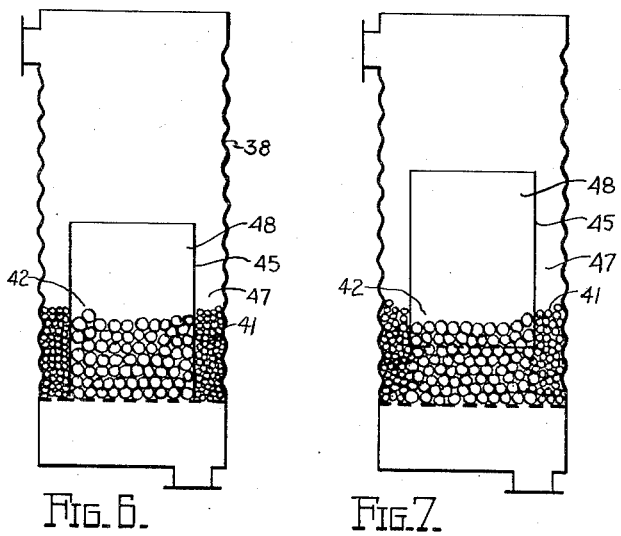
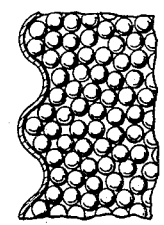
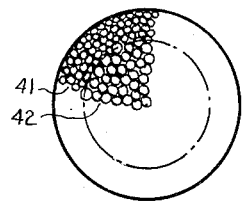
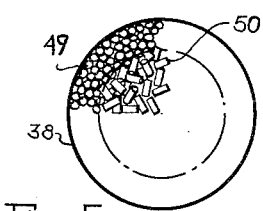
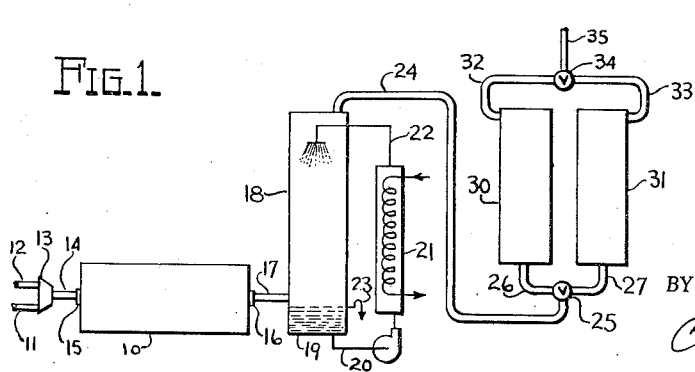
INVENTORS
DONALD BEGGS
CARROLL CONE
BY
Charles S. Haughey
atty.

United States Patent Office 3,038,790
Patented June 12, 1962

3,038,790
CONTACTING OF AGGREGATE MATERIALS
WITH FLUIDS
Donald Beggs and Carroll Cone, Toledo, Ohio, assignors, by mesne assignments, to Midland-Ross Corporation, Cleveland, Ohio, a corporation of Ohio
Filed June 9, 1958, Ser. No. 740,905
6 Claims. (Cl. 23—281)

This invention relates generally to improved fluid contacting apparatus of the packed column type and more specifically to method and apparatus for preferentially controlling the passage of fluid through a packed column to deter channeling effects.

There are many processes known in which fluids are contacted by a packed column of granular or aggregate material such as the treatment and reaction of gases and/or liquids in a packed bed, and treatment and reaction of pebble beds with heated air, etc.

It has been recognized that lateral maldistribution of fluid flow occurs in such packed columns and various attempts have been made to obviate such maldistribution. One of the factors which contributes to such maldistribution is the channeling effect of the fluid passing through the bed due to various surface tension forces. This channeling effect is usually most prevalent at the surface of the confining wall of the tower. The reason for this channeling effect at the walls is due to a greater number of voids which naturally occur between the wall and the packing material as compared to one particle of packing material to another. In gas drying towers a detrimental effect of such channeling is the saturation of the outer vertical portions of the desiccant material before the saturation of the core which consequently reduces the effectiveness of the bed.

Various methods have been suggested to compensate for uneven flow distribution, most of which involve mechanical structures which concomitantly increase the height of the bed required.

An object of the present invention is to provide method and apparatus for controlling the distribution of fluids through a packed tower in a manner which compensates for the tendency of the distributed fluid to channel in localized areas such as at the container wall.

It has been ascertained in accordance with the present invention that the distribution of the fluid being treated may be preferentially controlled by arranging packing material in vertical layers or cores, each of which contains aggregates different in size from an adjacent layer. In the usual cylindrical towers illustrated, the vertical layers or cores would take the form of one or more annular layers (which technically define hollow right circular cylinders) surrounding a center core or cylinder. Thus by placing a core or annular layer of fine aggregate material immediately adjacent or contiguous the wall of the container and a center core of coarser aggregate the fluid flow adjacent the wall can be matched with that of the center core.

As an alternative, the individual layers or cores may comprise material having a different configuration from the material in an adjacent core. Some materials with certain configurations lend themselves to packing with less voids than others. Therefore, by placing the core containing the least average voids in an area where channeling usually occurs, such channeling may be deterred or compensated for to provide substantially uniform fluid flow across the bed of aggregate material.

As a further deterrent to channeling, the side walls of the towers may be provided with serrations or corrugations horizontally arranged to disrupt the continuously vertical paths at the wall. The valleys of the serrations provide spaces for aggregate material to fill, while the peaks provide surfaces which the aggregate material is better able to match or form interfaces with, thus preventing direct vertical flow of fluids at the wall.

In order to understand the invention more fully, reference is made to the following description and accompanying drawings in which:

FIGURE 1 is a schematic diagram of gas generating apparatus embodying drying towers;

FIGURE 2 diagrammatically illustrates a vertical cross-section of a drying tower with its aggregate bed arranged in accordance with the invention;

FIGURE 3 diagrammatically illustrates the improvement of the invention incorporated in a gas absorber tower;

FIGURE 4 is a transverse fragmentary sectional view of a tower in which the layers of aggregate material are classified and arranged according to average particle size;

FIGURE 5 is a transverse fragmentary sectional view of a tower in which the layers of aggregate material are classified and arranged according to average particle configuration;

FIGURE 6 is a diagrammatic vertical cross-sectional view of a packed tower, with the top removed, in which a partition member is incorporated to arrange the aggregate material in vertical layers;

FIGURE 7 is a view similar to FIGURE 6 with the partition member partially withdrawn; and FIGURE 8 is an enlarged fragmentary and cross-sectional view of a corrugated tower side wall.

The arrangement and process of the present invention is not restricted to treating towers as shown in the drawings but may be applied to any packed bed tower through which a fluid is passed vertically.

This invention is particularly advantageous in drying towers used in connection with gas generator processes, such as the drying of metallurgical gases used for protective atmosphere in the annealing of steel and for many other purposes, and the embodiment shown in FIGURE 1 will be described in connection therewith.

Fuel and air are delivered to combustion chamber 10 by means of fuel and air pipes 11 and 12, mixer 13, manifold 14, and burner 15. The mixture is burned in chamber 10 and the hot products of combustion are discharged through port 16 and pipe 17. The gas may then be passed to a direct cooler 18 wherein water is sprayed or flowed counter-current to the gas flow to cool the products entering by pipe 17. The cooling water condenses water from the products of combustion and collects in sump 19 from which it is delivered through pipe 20 to an indirect heat exchanger 21, through pipe 22 and back into cooler 18. Excess of condensate is overflowed through waste trap 23.

Cooled and partially dehydrated combustion product gas, or flue gas, leaves the condensate cooler system by pipe 24 and passed to valve 25 from which it is passed alternately through pipes 26 and 27 to treating chambers or towers 30 and 31 to lower the dew point or moisture content of the product gas. It is customary to use such towers, containing alumina or other moisture absorbing aggregate, in pairs. One is used for drying, while the other is being reactivated, then reversing. Gas passing from the tower 30 or 31 passes to pipe 32 or 33 to valve 34 and delivered to use through pipe 35.

A more detailed explanation of method and means that may be employed to reactivate the drying towers may be had by referring to U.S. Patent 2,712,981, Beggs.

The treating chambers or towers 30 and 31 are identical conventional containers and may be of any desired cross-section, although preferably circular. Since the towers are identical, only tower 30 need be described. The tower is packed with alumina or other desiccant material. Gas to be dried is passed in through the openings of a reticulated support 39 in contact with the desiccant or other suitable packed drying material. After passing through the packed bed the dried gas is discharged through outlet 32.

The packing 40 in the tower, according to the invention, is arranged in vertical layers or cores whose transverse sections correspond to the configuration of the confining wall 38. Preferably, the outermost core contains aggregate material which presents smaller average voids when packed than any of the inner cores. The differential in average void sizes in one layer as compared to another may be controlled by using materials of different sizes, as illustrated in FIGURE 4. Thus by placing a core 41 of relatively fine material adjacent the wall and coarser material in the inner layer or core 42 the flow of the gases at the wall can be substantially matched with that through the inner core 41 and uniform flow of distribution across the bed attained.

The differential in average void sizes in one layer as compared to another may be controlled by using materials having different configurations, as illustrated in FIGURE 5. A core 49 of substantially spherical material may be placed adjacent the wall 38 where the least voids are desired. The inner core 50 may be comprised of material having a generally cylindrical configuration, or other material, which presents more voids when packed than the spherical material.

The improvement of the invention is also useful in gas absorber towers into which an absorbing solution is sprayed to wash the gas as illustrated in FIGURE 3. The operation and arrangement of the packed bed is similar to that shown in FIGURE 2. The absorbing solution is sprayed from head 43 over the packed bed comprising cores 41 and 42. The liquid solution has a tendency to migrate to the wall 37 and unless adequate compensation is provided channeling of the solution will occur. Such channeling results in inefficient operation. By arranging the packed material in the same manner as shown in FIGURE 2 not only will the channeling of the gases be prevented but channeling of the liquid absorbing solution will also be prevented, thus leading to more effective operation.

The aggregate material may be initially arranged in the tower 30 in vertical layers or cores 41 and 42 by placing an open end cylinder or partition 45 in the tower with cover 46 removed. Fine size aggregate is distributed in the space 47 between the container 30 and the cylinder 45 while coarser particles are distributed in the space 48 defined by the inserted partition 45. As the spaces are filled, the cylinder may be progressively lifted until the aggregate reaches the desired level and subsequently removed.

As an alternative to the above described method of filling the tower and defining cores of aggregate material of preferred geometry, the cylinder may be composed of destructible material. When operations are begun, the heat from the operation, or other factors which have a destructive effect upon the cylinder, will destroy the cylinder and permit the interfaces of the respective cores to interlock.

Thus by preferentially selecting the aggregate material comprising the various cores, the flow of fluids through the composite aggregate material may be controlled. By placing a finer core of aggregate material adjacent to the container wall substantially uniform flow may be attained across the bed. It has been determined that best results are obtained when the fine aggregate is one-half, or less, than the size of the main bed or core.

The material of the individual cores may be of the same general chemical composition or of different chemical compositions without departing from the scope of the invention.

It will also be readily appreciated that a plurality of aggregate cores may be defined in each of the passages of a multiple pass treating tower without departing from the scope or spirit of the invention.

We claim:

1. In apparatus for producing a dry metallurgical gas comprising combustion means for burning fuel and air and producing products of combustion, a cooler for cooling said products of combustion, a dryer and means for directing said products of combustion from said cooler to said dryer, the improvement in said dryer which comprises a generally cylindrical shaped vertical housing containing therein at least one annular layer of aggregate material extending along a substantial length of said housing and surrounding a generally cylindrical shaped core size than the aggregate material in said annular layer.

2. In apparatus for producing a dry metallurgical gas comprising combustion means for burning fuel and air and producing products of combustion, and a cooler for cooling said products of combustion, improved dryer means comprising wall means forming a generally cylindrical shaped vertical housing having top and bottom closures; grid means within said housing defining with said bottom closure a plenum chamber; a gas inlet to said plenum chamber; a gas outlet adjacent the upper portion of said housing; a packed bed of aggregate desiccant material in said housing supported on said grid, said bed comprising an annular layer of aggregate desiccant material contiguous to said wall means and surrounding a generally cylindrical shaped core of aggregate desiccant material, the aggregate material in said layer having a smaller average void size between its constituent particles than the aggregate material in said core, and means for directing the products of combustion from said cooler to the inlet of said housing and through said packed bed to said outlet.

3. An improved packed bed treating tower comprising in combination: wall means forming a generally cylindrical shaped vertical housing; an annular layer of aggregate material within and extending along a substantial length of said housing, contiguous to said wall means, and surrounding a generally cylindrical shaped core of aggregate material having an average graded particulate size larger than the aggregate material in said annular layer.

4. An improved packed bed treating tower comprising, in combination: wall means forming a generally cylindrical shaped vertical housing; an annular layer of aggregate material within and extending along a substantial length of said housing, contiguous to said wall means, and surrounding a generally cylindrical shaped core of aggregate material, the aggregate material in said layer having a smaller average void size between its constitutent particles than the aggregate material in said core.

5. An improved packed bed fluid treating tower comprising, in combination: wall means forming a generally cylindrical shaped vertical housing; a sleeve destructible by the fluid to be treated concentrically disposed within said housing and defining with said wall means an annular space therebetween; aggregate material disposed within said sleeve; and aggregate material disposed within said annular space which defines voids of less average size when packed than the aggregate material disposed within said sleeve.

6. Apparatus according to claim 1 wherein the generally cylindrical shaped core has a generally circular shaped cross section.

References Cited in the file of this patent

UNITED STATES PATENTS

| | | |
|---|---|---|
| 1,267,005 | Slick | May 21, 1918 |
| 2,077,563 | Henry | Apr. 20, 1937 |
| 2,143,015 | Kleinschmidt | Jan. 10, 1939 |
| 2,145,240 | Adams | Jan. 31, 1939 |
| 2,199,258 | Gray | Apr. 30, 1940 |
| 2,674,395 | Ravlin | Apr. 6, 1954 |
| 2,712,981 | Beggs | July 12, 1955 |
| 2,743,997 | Geisler | May 1, 1956 |
| 2,787,530 | Staiger | Apr. 12, 1957 |

FOREIGN PATENTS

| | | |
|---|---|---|
| 510,985 | Great Britain | Aug. 11, 1939 |

UNITED STATES PATENT OFFICE
CERTIFICATE OF CORRECTION

Patent No. 3,038,790                      June 12, 1962

Donald Beggs et al.

It is hereby certified that error appears in the above numbered patent requiring correction and that the said Letters Patent should read as corrected below.

Column 4, line 26, after "core" insert -- of aggregate material having a larger average particulate --.

Signed and sealed this 9th day of October 1962.

(SEAL)
Attest:

ERNEST W. SWIDER
Attesting Officer

DAVID L. LADD
Commissioner of Patents